(12) United States Patent
Bullard

(10) Patent No.: US 9,599,274 B2
(45) Date of Patent: Mar. 21, 2017

(54) MULTI-STAGE THERMAL ISOLATOR FOR FOCAL PLANE ARRAYS AND OTHER DEVICES

(71) Applicant: Raytheon Company, Waltham, MA (US)

(72) Inventor: Andrew L. Bullard, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 567 days.

(21) Appl. No.: 13/732,245

(22) Filed: Dec. 31, 2012

(65) Prior Publication Data

US 2014/0183307 A1 Jul. 3, 2014

(51) Int. Cl.

| | |
|---|---|
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |

(Continued)

(52) U.S. Cl.
CPC ............ *F16M 11/00* (2013.01); *G01J 5/0205* (2013.01); *G01J 5/061* (2013.01); *G02B 7/008* (2013.01); *Y10T 29/49826* (2015.01)

(58) Field of Classification Search
CPC .. F16M 5/00; F16M 7/00; F24F 13/32; B25B 11/02
USPC ....... 248/688, 550, 644, 673, 676, 678, 156, 248/370, 158, 440, 440.1, 188, 346.01, 248/346.02, 346.03, 901, 146, 151, 163.1, 248/27.8, 153, 315, 311.2; 108/93; 52/573.1; 165/68, 185, 135, 136; 269/900, 289 R See application file for complete search history.

(56) References Cited

U.S. PATENT DOCUMENTS 578,012 A * 3/1897 Harris ............................... 4/285
861,093 A * 7/1907 Cordley ................. F16M 11/00
108/50.13

(Continued)

OTHER PUBLICATIONS

International Search Report dated Jan. 29, 2014 in connection with International Patent Application No. PCT/US2013/067826, 4 pages.

(Continued)

*Primary Examiner* — Terrell McKinnon
*Assistant Examiner* — Michael McDuffie

(57) ABSTRACT

An apparatus includes a first interface platform and a second interface platform. One interface platform is configured to be coupled to a support structure, and the other interface platform is configured to be coupled to a device that operates at a temperature different than a temperature of the support structure. The apparatus also includes at least one intermediate stage platform and struts connecting the first and second interface platforms to the at least one intermediate stage platform. Top surfaces of the interface platforms may be substantially coplanar. At least a portion of the second interface platform can reside within an opening of the first interface platform. The struts can be arranged in a nested configuration having first and second sets of struts, where the second set is located within the first set. Each strut in the first set could be substantially parallel to an adjacent strut in the second set.

22 Claims, 3 Drawing Sheets

(51) Int. Cl.
*G01J 5/02* (2006.01)
*G01J 5/06* (2006.01)
*G02B 7/00* (2006.01)

(56) References Cited

U.S. PATENT DOCUMENTS

| | | | | |
|---|---|---|---|---|
| 1,179,400 | A * | 4/1916 | Calhoun | B25H 1/0007 269/296 |
| 1,476,062 | A * | 12/1923 | Eccles | 248/678 |
| 2,552,983 | A * | 5/1951 | Lee | A61L 2/26 211/181.1 |
| 3,272,466 | A * | 9/1966 | Sherman | B65F 1/141 248/146 |
| 3,592,422 | A * | 7/1971 | Paine et al. | 248/589 |
| 3,952,979 | A * | 4/1976 | Hansen | 248/550 |
| 5,050,339 | A * | 9/1991 | Howell | 47/39 |
| 5,058,993 | A | 10/1991 | Wakugawa | |
| 5,275,288 | A * | 1/1994 | Lockett | A47G 19/02 206/505 |
| 5,660,227 | A * | 8/1997 | Crowe | H01L 23/473 165/185 |
| 6,578,802 | B1 * | 6/2003 | Thier | B67D 3/0029 248/146 |
| 6,832,561 | B2 * | 12/2004 | Johnson | A47B 83/001 108/50.01 |
| 6,880,817 | B2 * | 4/2005 | Clarke | B25B 11/005 269/296 |
| 6,895,712 | B2 * | 5/2005 | Gunderman et al. | 47/39 |
| 6,976,435 | B2 * | 12/2005 | Lucas et al. | 108/51.11 |
| 7,131,364 | B2 * | 11/2006 | Brazell | 83/477.2 |
| 7,340,859 | B2 * | 3/2008 | Palsrok | A01G 9/022 211/126.6 |
| 7,415,785 | B1 * | 8/2008 | Morgan | D05C 1/04 38/102.2 |
| 7,798,465 | B1 * | 9/2010 | Meverden | 248/678 |
| 8,944,637 | B2 * | 2/2015 | Spiro | F21S 2/005 165/185 |
| D734,094 | S * | 7/2015 | Vogds | D7/354 |
| 2003/0161107 | A1 * | 8/2003 | Segala | H01L 23/4093 361/704 |
| 2005/0211868 | A1 * | 9/2005 | Scott | 248/688 |
| 2008/0290221 | A1 | 11/2008 | Dupuis et al. | |
| 2009/0020109 | A1 * | 1/2009 | Rheault | A47J 33/00 126/25 R |
| 2010/0025030 | A1 * | 2/2010 | Wang | H01L 23/3677 165/185 |
| 2010/0038064 | A1 * | 2/2010 | Liu | F28F 1/32 165/181 |
| 2010/0065252 | A1 * | 3/2010 | Methe | G02B 7/008 165/96 |
| 2010/0139906 | A1 * | 6/2010 | Kohl | A47J 36/24 165/185 |
| 2010/0232109 | A1 * | 9/2010 | Liu | H01L 23/427 361/697 |
| 2011/0048678 | A1 * | 3/2011 | Lian | H01L 23/427 165/104.26 |
| 2011/0073283 | A1 * | 3/2011 | Huang | H01L 23/3672 165/104.26 |
| 2012/0120516 | A1 | 5/2012 | Harrell et al. | |
| 2016/0044826 | A1 * | 2/2016 | Hartl | F27D 21/00 361/709 |

OTHER PUBLICATIONS

Written Opinion of International Searching Authority dated Jan. 29, 2014 in connection with International Patent Application No. PCT/US2013/067826, 7 pages.

Jensen, et al.; "Optical stability testing of the Fiber Support Technology (FiST) focal plane assembly of the SABER instrument"; Space Dynamics Laboratory, Utah State University; Part of the SPIE conference on Cryogenic Optical Systems and Instruments VIII; San Diego, California; Jul. 1998; pp. 230-241.

European Patent Office, "Communication pursuant to Article 94(3) EPC," Application No. 13 799 700.3-1562, Dec. 9, 2016, 25 pages, publisher EPO, Munich, Germany.

Jensen, Scott M., et al.: "Optical stability testing of the fiber support technology (FiST) focal plane assembly of the SABER instrument," Part of the SPIE Conference on Cryogenic Optical Systems and Instruments VIII, Proceedings of SPIE, vol. 3435, Sep. 17, 1998, pp. 230-241 available at http://spiedigitallibrary.org/.

* cited by examiner

MULTI-STAGE THERMAL ISOLATOR FOR FOCAL PLANE ARRAYS AND OTHER DEVICES

TECHNICAL FIELD

This disclosure is generally directed to thermal isolation. More specifically, this disclosure relates to a multi-stage thermal isolator for focal plane arrays and other devices.

BACKGROUND

A focal plane array is an image sensing device where pixels are positioned at the focal plane of a lens. Focal plane arrays are used in various types of applications, including long wave infrared (LWIR) sensors. In these types of applications, it is often necessary or desirable to maintain the temperature of a focal plane array at cryogenic temperatures. Thermal isolators are typically used to couple the colder focal plane arrays to warmer structures.

Thermal isolators of various sizes, shapes, and materials have been developed over the years. When supporting relatively small masses, thermal isolators can be generally simple in design, but these isolators often suffer from low strengths, high costs, or high coefficients of thermal expansion (CTE). More efficient thermal isolators often require multiple components that are assembled together in order to constrain six degrees of freedom of motion. However, these types of thermal isolators can suffer from low structural stiffness, low resonant frequencies, and higher thermal conductivities than desired.

SUMMARY

This disclosure provides a multi-stage thermal isolator for focal plane arrays and other devices.

In a first embodiment, an apparatus includes a first interface platform and a second interface platform. One interface platform is configured to be coupled to a support structure, and the other interface platform is configured to be coupled to a device that operates at a temperature different than a temperature of the support structure. The apparatus also includes at least one intermediate stage platform and struts connecting the first and second interface platforms to the at least one intermediate stage platform.

In a second embodiment, a system includes a support structure and a device configured to operate at a temperature different than a temperature of the support structure. The system also includes a thermal isolator configured to reduce heat transfer between the support structure and the device. The thermal isolator includes a first interface platform and a second interface platform. One interface platform is configured to be coupled to the support structure, and the other interface platform is configured to be coupled to the device. The thermal isolator also includes at least one intermediate stage platform and struts connecting the first and second interface platforms to the at least one intermediate stage platform.

In a third embodiment, a method includes forming first and second interface platforms. One interface platform is configured to be coupled to a support structure, and the other interface platform is configured to be coupled to a device that operates at a temperature different than a temperature of the support structure. The method also includes forming at least one intermediate stage platform and forming multiple struts for connecting the first and second interface platforms to the at least one intermediate stage platform.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
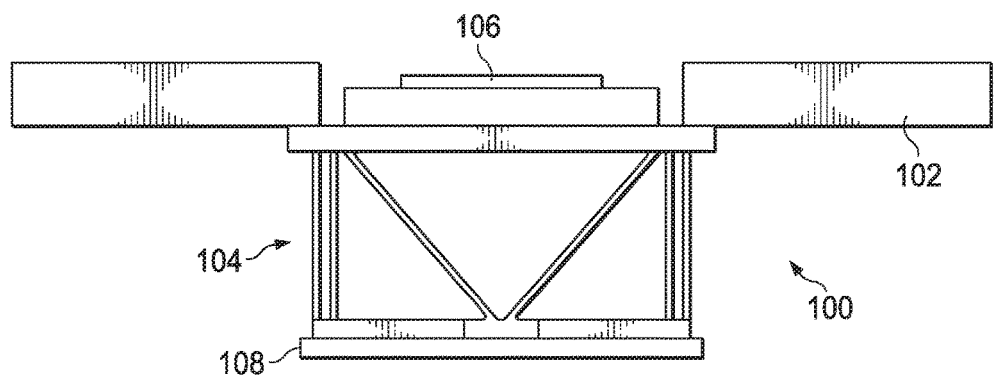
FIG. 1 illustrates an example system containing a multi-stage thermal isolator in accordance with this disclosure.

FIG. 1 illustrates an example system 100 containing a multi-stage thermal isolator in accordance with this disclosure. As shown in FIG. 1, the system 100 includes a support structure 102, a multi-stage thermal isolator 104, and a device 106. The support structure 102 generally represents a structure on or to which the thermal isolator 104 can be mounted. The thermal isolator 104 could be mounted on or to the support structure 102 in any suitable manner, such as by using bolts or other connectors that fit through openings in the thermal isolator 104. The support structure 102 includes any suitable structure that supports a thermal isolator, such as a warm-stage bench.

The device 106 generally represents a structure that operates at a different temperature (higher or lower) than a temperature of the support structure 102. For example, the device 106 could be cooled to a temperature below that of the support structure 102. In some embodiments, the device 106 is cooled to an extremely low temperature, such as to a temperature within a cryogenic temperature range below 100° K. The device 106 may require such low temperatures in order to operate correctly. Alternatively, the device 106 could represent a device that operates at higher temperatures than the support structure 102. The device 106 includes any suitable structure that operates at a temperature different than that of a support structure. As a particular example, the device 106 can represent a cryocooled long wave infrared (LWIR) focal plane array. However, any other suitable device 106 could be used here.

The thermal isolator 104 represents a structure that can be mounted on or to the support structure 102, and the device 106 can be mounted on or to the thermal isolator 104. The thermal isolator 104 reduces heat transfer between the support structure 102 and the device 106. Among other things, this can make it easier to maintain the device 106 at a desired temperature and reduce energy usage by a cooling or heating system that controls a temperature of the device 106. As described in more detail below, the thermal isolator 104 represents a multi-stage structure having a warm stage platform, a cold stage platform, and at least one intermediate stage platform that connects the warm and cold stage platforms.

The thermal isolator 104 can be formed from any suitable material(s). The thermal isolator 104 can also be fabricated using any suitable manufacturing technique(s). In some embodiments, for example, the thermal isolator 104 can be fabricated from a single piece of titanium or other material(s) using conventional milling, electric discharge machining (EDM), or other operations. In other embodiments, the thermal isolator 104 can be assembled from multiple pieces that are manufactured separately. In yet other embodiments, the thermal isolator 104 can be integrally formed using casting or injection molding. Additional details regarding an example embodiment of the thermal isolator 104 are provided below.

In some embodiments, at least one temperature control structure 108 can be mounted on or to the thermal isolator 104. In the example in FIG. 1, the temperature control structure 108 is mounted to an intermediate stage platform of the thermal isolator 104. The temperature control structure 108 can be used in this example to maintain the intermediate stage platform of the thermal isolator 104 at a desired intermediate temperature between the temperature of the support structure 102 and the temperature of the device 106. The temperature control structure 108 includes any suitable structure for maintaining or altering the temperature of an intermediate stage platform of a thermal isolator, such as a cold plate or a heater.

Although FIG. 1 illustrates one example of a system 100 containing a multi-stage thermal isolator, various changes may be made to FIG. 1. For example, the support structure 102 and the device 106 could have any suitable size, shape, and dimensions. Also, any number of thermal isolators 104 could be used to mount any number of devices 106 on or to one or more support structures 102. In addition, the positions of the support structure 102 and the device 106 could be reversed.

Figure 2:
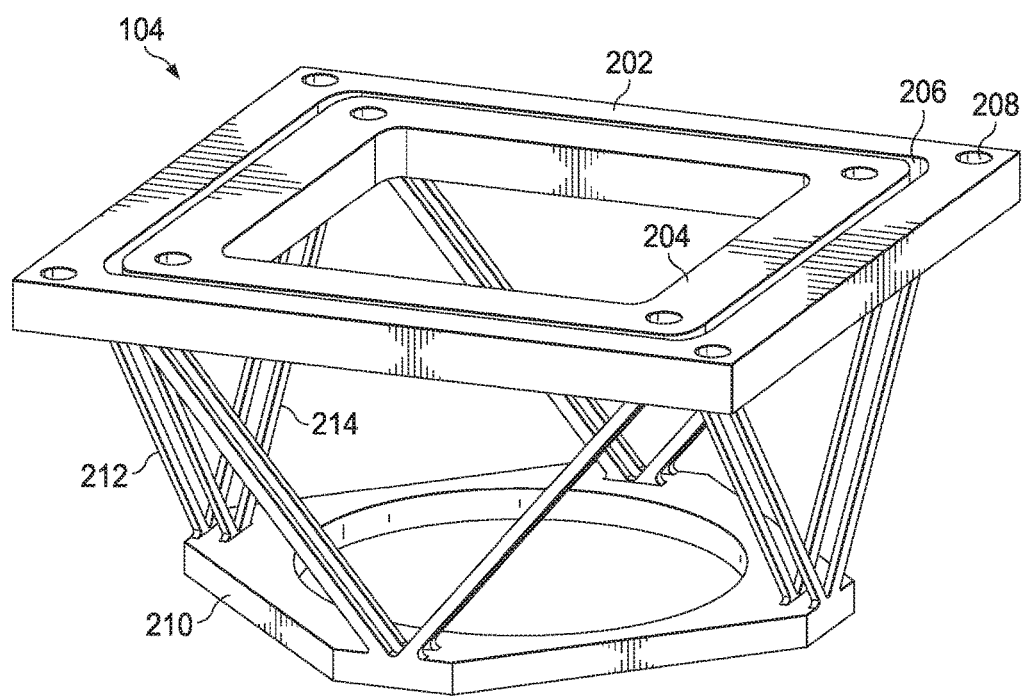
FIG. 2 illustrates an example multi-stage thermal isolator in accordance with this disclosure.

FIG. 2 illustrates an example multi-stage thermal isolator 104 in accordance with this disclosure. As shown in FIG. 2, the thermal isolator 104 includes a first interface platform 202 and a second interface platform 204 separated by a gap 206. In some embodiments, the interface platform 202 is configured to be mounted on or to the support structure 102, and the interface platform 204 is configured to contact and support the device 106. In other embodiments, the interface platform 204 is configured to be mounted on or to the support structure 102, and the interface platform 202 is configured to contact and support the device 106. The interface platform coupled to the warmer support structure/device can be referred to as a "warm stage" interface platform, while the interface platform coupled to the cooler support structure/device can be referred to as a "cold stage" interface platform.

Each interface platform 202-204 can be formed from any suitable material(s), such as titanium. Each interface platform 202-204 could also have any suitable size, shape, and dimensions. While shown as being in the form of a square ring (a square outer shape with a square-shaped opening), each interface platform 202-204 could have any other suitable outer shape, and each interface platform 202-204 could have an opening of any other suitable shape. Further, in this example, the heights of the interface platforms 202-204 are substantially equal, and all or substantially all of the interface platform 204 resides within the opening in the interface platform 202. This is not necessarily required. For instance, the interface platform 204 could have a height that is greater than the height of the interface platform 202. The interface platform 202 could also have a height that is greater than the height of the interface platform 204. In addition, the interface platform 204 need not reside directly within the opening of the interface platform 202.

The gap 206 exists between the interface platform 202 and the interface platform 204 along the outer periphery of the interface platform 204. The gap 206 represents empty space that substantially reduces or prevents heat transfer between the interface platforms 202-204. The gap 206 could represent any suitable amount of empty space between the interface platforms 202-204. The empty space within the gap 206 could be filled with one or more gases or other material(s), or the thermal isolator 104 could operate within a vacuum.

Note that in some embodiments, the top or outer surfaces of the interface platforms 202-204 can be substantially coplanar. In particular embodiments, the interface platforms 202-204 can be coplanar to within one or several millionths of an inch, although such precision may not be required in certain applications. Such a high level of precision could be obtained, for example, by fabricating the interface platforms 202-204 and then "lapping" the structure by running the outer surfaces of the interface platforms 202-204 over a granite or other table with a polishing compound for a specified length of time (such as one or more hours). Any other suitable procedure, such as precision grinding or polishing, could be used to achieve a desired level of co-planarity in the outer surfaces of the interface platforms 202-204. The use of substantially coplanar interface platforms 202-204 allows for very precise placement of the device 106 with respect to the support structure 102. Other techniques could also be used to fabricate the interface platforms 202-204. However, note that substantial coplanarity of the interface platforms 202-204 is not required, such as when the device 106 can be tuned to handle a height difference between the interface platforms.

Various holes 208 are also formed through the interface platforms 202-204. These holes 208 represent portions of the interface platforms 202-204 through which bolts or other connectors could be used to secure the interface platforms 202-204 to the support structure 102 and the device 106. The holes 208 could have any suitable cross-sectional shape, size, and dimensions depending on the type(s) of connector(s) being used. The holes 208 could also be formed in any suitable manner, such as by using conventional milling operations or laser drilling operations.

In this example, the thermal isolator 104 includes at least one intermediate stage platform 210. The intermediate stage platform 210 physically connects to the interface platform 202 via struts 212, and the intermediate stage platform 210 physically connects to the interface platform 204 via struts 214. When the interface platforms 202 is mounted on or to the support structure 102, the struts 212 help to hold the intermediate stage platform 210 in place, and the struts 214 help to hold the interface platform 204 in place. Alternatively, when the interface platforms 204 is mounted on or to the support structure 102, the struts 214 help to hold the intermediate stage platform 210 in place, and the struts 212 help to hold the interface platform 202 in place. The intermediate stage platform 210 can also be coupled to a temperature control structure 108 that helps to maintain the temperature of the intermediate stage platform 210 at some intermediate temperature between the temperature of the interface platform 202 and the temperature of the interface platform 204.

The intermediate stage platform 210 could be formed from any suitable material(s), such as titanium. The intermediate stage platform 210 could also be fabricated in any suitable manner. The intermediate stage platform 210 could further have any suitable size, shape, and dimensions. In this example, the intermediate stage platform 210 is shown as having the form of a square ring with faceted corners and a circular opening. However, the intermediate stage platform 210 could have any other suitable outer shape and an opening of any other suitable shape.

As shown in FIG. 2, eight struts 212 form an octopod that couples the interface platform 202 and the intermediate stage platform 210, and eight struts 214 form an octopod that couples the interface platform 204 and the intermediate stage platform 210. Each strut 212-214 could be formed from any suitable material(s), such as titanium. Each strut 212-214 could also be fabricated in any suitable manner. Each strut 212-214 could further have any suitable size, shape, and dimensions. In this example, the struts 212-214 are shown as having a generally square cross-sectional shape, although the struts 212-214 could have any other suitable cross-sectional shape. Also, each strut 212-214 may represent a solid structure or a hollow tube or other structure with empty space within that strut. In general, the struts' thicknesses or other design parameters can be tuned to provide the desired strength, stiffness, and/or thermal isolation between platforms, and the struts between one pair of platforms may or may not have the same size and shape as the struts between another pair of platforms. Tuning the thermal isolation between platforms using strut thickness or other design parameter(s) can also be a tool for controlling the position of the stage on which the device 106 is mounted.

Note that any number of struts 212-214 could be used in each set of struts in the thermal isolator 104. In this example, there are eight struts in each set, forming multiple octopods. In other embodiments, a different number of struts could be used in at least one of the sets. For instance, each set could include six struts, forming multiple hexapods. Moreover, in this example, one set of struts 214 is nested inside the other set of struts 212, forming nested octopods. The term "nested" generally indicates that one set of structures (struts) is located within another set of structures (struts). In addition, in this example, the struts 212 are generally parallel with the adjacent struts 214, and the struts 212 are connected to the intermediate stage platform 210 near locations where the struts 214 are connected to the intermediate stage platform 210. In other embodiments, however, the inner struts 214 could be inverted so that the struts 212-214 cross one another when the thermal isolator 104 is viewed from the side.

As noted above, the thermal isolator 104 could be formed from a single piece of material so that all components of the thermal isolator 104 form an integral device. In these embodiments, for example, conventional milling operations could be used to form the interface platforms 202-204, the gap 206, the holes 208, and the intermediate stage platform 210 out of a single piece of material like titanium. Electric discharge machining in two directions can then be used to remove portions of the material to form the struts 212-214. In other embodiments, the interface platforms 202-204 and the intermediate stage platform 210 could be machined or otherwise formed separately, such as by using separate pieces of titanium. The interface platforms 202-204 and the intermediate stage platform 210 could then be coupled together using struts 212-214 to form a completed isolator. In yet other embodiments, casting or injection molding can be used to form an integral thermal isolator 104. At some point during fabrication, the interface platforms 202-204 can be processed so that their outer surfaces are substantially coplanar.

In the design shown in FIG. 2, the thermal isolator 104 helps to provide improved or optimally efficient thermal isolation versus structural rigidity through the use of nested struts that form multiple octopods, hexapods, or other structures. Moreover, the entire thermal isolator 104 can be fabricated from one or multiple pieces of material, providing a simple and compact design that can be achieved in various ways. In some embodiments, the thermal isolator 104 could be as small as about one inch (2.54 cm) in width or even smaller, or the thermal isolator 104 could be much larger. The size can depend, among other things, on the application and the device 106 to be supported. Further, the thermal isolator 104 here offers excellent dimensional stability and can provide substantially coplanar mounting surfaces for the cold and warm stages to support alignment transfer. In addition, the thermal isolator 104 can provide highly efficient thermal isolation of the device 106, which may be particularly useful when parasitic thermal loads are primarily conducted during operation of cryogenic devices (such as below 100° K).

Note that while FIG. 2 shows a single intermediate stage platform 210, the thermal isolator 104 could include multiple intermediate stage platforms. For example, one set of struts could connect the interface platform 202 to a first intermediate stage platform, a second set of struts could connect the first intermediate stage platform to a second intermediate stage platform, and a third set of struts could connect the second intermediate stage platform to the interface platform 204. The intermediate stage platforms could have associated temperature control structures 108 so that the intermediate stage platforms get progressively colder. Any number of intermediate stage platforms could be used in the thermal isolator 104.

Also note that the thermal isolator 104 could be used in a wide range of applications. For instance, smaller thermal isolators 104 could be used in smaller applications such as handheld infrared imaging devices. Larger thermal isolators 104 could be used in larger applications, such as satellites or other space-imaging devices. In general, the thermal isolator 104 could be used in any application where thermal isolation of one component from another is desired.

Although FIG. 2 illustrates one example of a multi-stage thermal isolator 104, various changes may be made to FIG. 2. For example, as noted above, the sizes, shapes, and dimensions of the components in the thermal isolator 104 shown in FIG. 2 are examples only. Moreover, multiple intermediate stage platforms could be used in the thermal isolator 104, and none, one, some, or all of the intermediate stage platforms could have associated temperature control structures for adjusting or controlling the temperature(s) of the intermediate stage platform(s). Further, while shown as having struts arranged in two octopods, a different number of struts could be used to connect an interface platform to an intermediate stage platform or to connect two intermediate stage platforms. For instance, three or more struts could be used to connect two platforms in a thermal isolator. In addition, any number of thermal isolators 104 could be used to mount any number of devices 106 on or to one or more support structures 102. As a particular example, it is possible to "stack" multiple thermal isolators 104, where the interface platform 204 of one isolator 104 is mounted on or to the interface platform 202 of another isolator 104.

Figure 3:
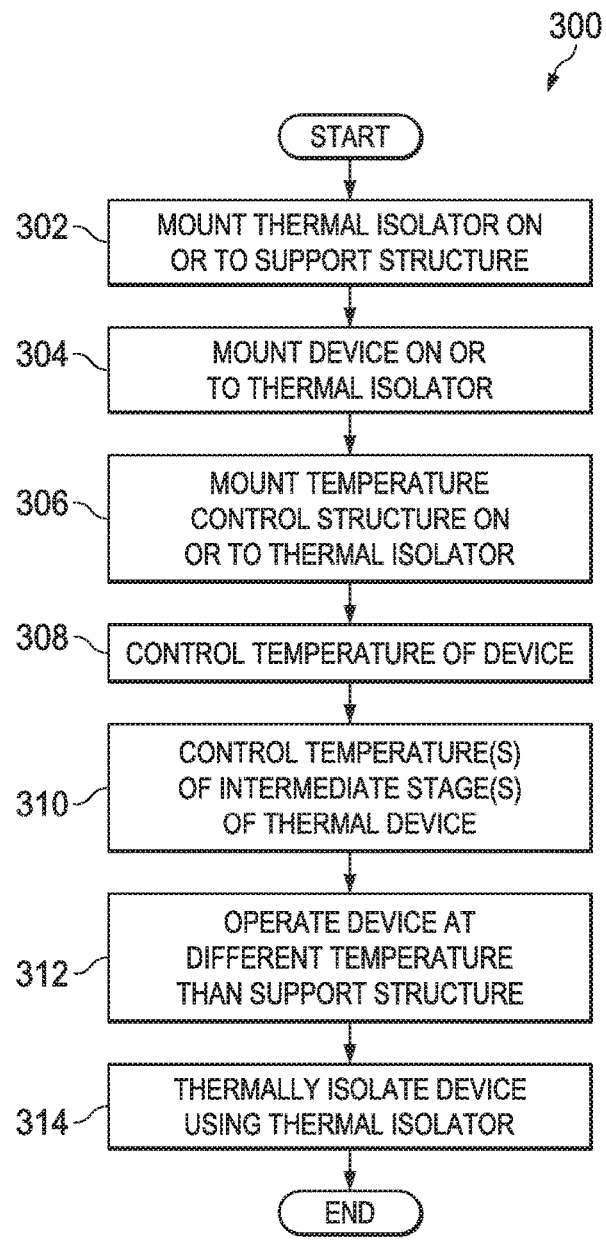
FIG. 3 illustrates an example method for thermal isolation using a multi-stage thermal isolator in accordance with this disclosure.

FIG. 3 illustrates an example method 300 for thermal isolation using a multi-stage thermal isolator in accordance with this disclosure. For ease of explanation, the method 300 is described with respect to the thermal isolator 104 as shown in FIG. 2 operating in the system 100 as shown in FIG. 1. The method 300 could be used with any other suitable thermal isolator and in any other suitable system.

As shown in FIG. 3, a thermal isolator is mounted on or to a support structure at step 302, and a device is mounted on or to the thermal isolator at step 304. This could include, for example, attaching the thermal isolator 104 to the support structure 102 using bolts or other connectors. This could also include attaching the device 106 to the thermal isolator 104 using bolts or other connectors. The support structure 102 could represent an optical bench or other structure that is typically higher in temperature, and the device 106 could represent a focal plane array or other device that typically operates at lower temperature (such as sub-ambient or cryogenic temperatures). Of course, the device 106 could operate at a higher temperature than the support structure 102. The device 106 can include or be coupled to a cryogenic cooler, heater, or other structure that controls a temperature of the device 106.

At least one temperature control structure is mounted to the thermal isolator at step 306. This could include, for example, mounting one or more temperature control structures 108 on one or more intermediate stage platforms 210 of the thermal isolator 104. The temperature control structure(s) 108 can be used to alter the temperature(s) of the intermediate stage platform(s) 210. However, each intermediate stage platform does not necessarily require use of its own temperature control structure or even any temperature control structure.

The temperature of the device is controlled at step 308. This could include, for example, an external or internal cooling or heating system altering the temperature of the device 106 to sub-ambient or cryogenic temperatures. One or more temperatures of the one or more intermediate stages are controlled at step 310. This could include, for example, the temperature control structure(s) 108 adjusting or controlling the temperature(s) of the intermediate stage platform(s) 210. The intermediate stage platform(s) 210 could be adjusted to temperatures between the temperature of the support structure 102 and the temperature of the device 106. The device can operate at a temperature different than that of the support structure at step 312, and the device is thermally isolated using the thermal isolator at step 314. This could include, for example, operating the device 106 at the sub-ambient or cryogenic temperature while the thermal isolator 104 reduces heat transfer from the support structure 102 to the device 106. This reduced heat transfer can help to reduce or minimize energy usage or coolant usage needed to maintain the device 106 at a desired temperature or within a desired temperature range.

Although FIG. 3 illustrates one example of a method 300 for thermal isolation using a multi-stage thermal isolator, various changes may be made to FIG. 3. For example, while shown as a series of steps, various steps in FIG. 3 could overlap, occur in parallel, occur in a different order, or occur any number of times. As a particular example, steps 308-312 could all occur at the same time.

Figure 4:
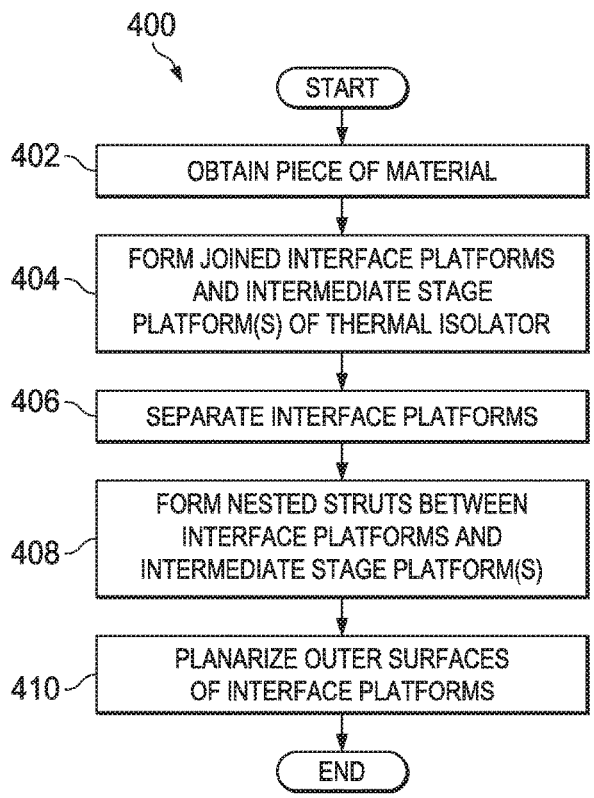
FIGS. 4 and 5 illustrate example methods for forming a multi-stage thermal isolator in accordance with this disclosure.
Figure 5:
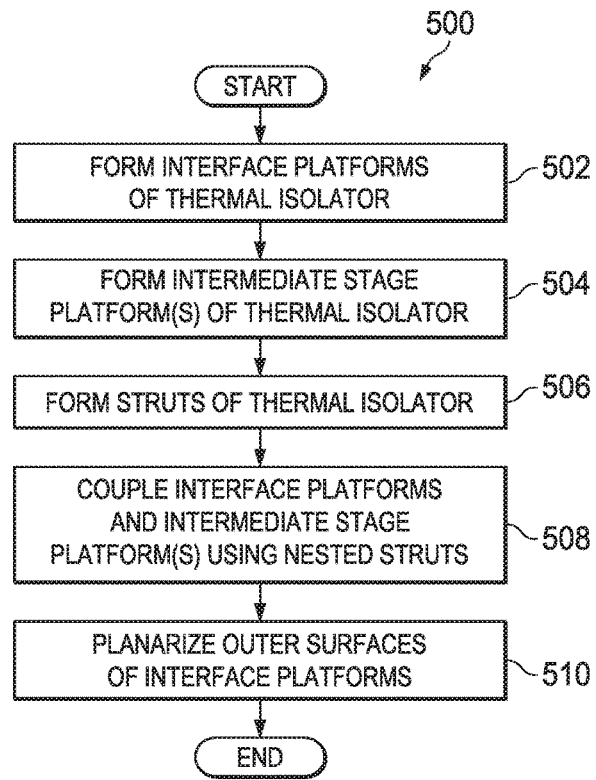

FIGS. 4 and 5 illustrate example methods 400 and 500 for forming a multi-stage thermal isolator in accordance with this disclosure. For ease of explanation, the methods 400 and 500 are described with respect to the thermal isolator 104 as shown in FIG. 2. The methods 400 and 500 could be used with any other suitable thermal isolator.

As shown in FIG. 4, the method 400 involves fabricating a thermal isolator as an integral unit. A piece of material is obtained at step 402. This could include, for example, obtaining a piece of titanium or other material(s) in a size that equals or exceeds the desired size of the thermal isolator 104.

Joined interface platforms and one or more intermediate stage platforms are formed in the piece of material at step 404. This could include, for example, using conventional milling or other technique(s) to form the interface platforms 202-204 (without the gap 206) and the intermediate stage platform(s) 210. Material still resides between the interface platforms and the intermediate stage platform(s) where struts are to be formed. The interface platforms are separated from each other at step 406. This could include, for example, using conventional milling or other technique(s) to form the gap 206 between the interface platform 202 and the interface platform 204.

Nested struts are formed between the interface platforms and the intermediate stage platform(s) in the piece of material at step 408. This could include, for example, using electric discharge machining or other technique(s) to form struts 212-214 that are arranged in multiple octopods or hexapods. If a single intermediate stage platform 210 is used, struts can connect the interface platforms 202-204 to the single intermediate stage platform 210. If multiple intermediate stage platforms 210 are used, struts can connect the interface platforms 202-204 to different intermediate stage platforms 210, and struts can connect the intermediate stage platforms 210 together. The struts 212-214 are integral to the interface platforms 202-204 and the intermediate stage platform(s) 210 since they are formed from the same piece of material.

Fabrication of the thermal isolator is then completed, which could include planarizing the outer surfaces of the interface platforms at step 410. This could include, for example, lapping, polishing, or grinding the outer surfaces of the interface platforms 202-204 so that the outer surfaces are substantially coplanar.

As shown in FIG. 5, the method 500 involves fabricating a thermal isolator using different components that are formed and then assembled together. Interface platforms are formed at step 502. This could include, for example, using conventional milling or other technique(s) to form separate interface platforms 202-204 using one or more pieces of material. One or more intermediate stage platforms are formed at step 504. This could include, for example, using conventional milling or other technique(s) to form one or more separate intermediate stage platforms 210 using one or more pieces of material. Struts for the thermal isolator are formed at step 506. This could include, for example, forming solid or hollows tubes or other structures using one or more pieces of material.

The interface platforms and the intermediate stage platform(s) are coupled together using a nested arrangement of the struts at step 508. If a single intermediate stage platform 210 is used, this could include using struts to connect the interface platforms 202-204 to the single intermediate stage platform 210. If multiple intermediate stage platforms 210 are used, this could include using struts to connect the interface platforms 202-204 to different intermediate stage platforms 210 and using struts to connect the intermediate stage platforms 210. Any suitable mechanism can be used to couple a strut to an interface platform or intermediate stage platform, such as brazing or welding.

Fabrication of the thermal isolator is then completed, which could include planarizing the outer surfaces of the interface platforms at step 510. This could include, for example, lapping, polishing, or grinding the outer surfaces of the interface platforms 202-204 so that the outer surfaces are substantially coplanar.

Although FIGS. 4 and 5 illustrate examples of methods 400 and 500 for forming a multi-stage thermal isolator, various changes may be made to FIGS. 4 and 5. For example, while shown as series of steps, various steps in each figure could overlap, occur in parallel, occur in a different order, or occur any number of times. Also, a combination of these techniques could be used to form the thermal isolator 104, such as when some (but not all) of the interface/intermediate platforms are integral with various struts and others of the interface/intermediate platforms are brazed, welded, or otherwise connected to various struts. Further, planarization of the interface platforms 202-204 is not required, as an offset in height may be acceptable in various situations. Other techniques could further be used to form the thermal isolator 104, such as when casting or injection molding is used to form all components of the thermal isolator 104 simultaneously. One example type of material that could be used during casting or injection molding is a protruded glass-reinforced polyetherimide like ULTEM 2300.

Note that in general, the multi-stage thermal isolator 104 could be used to separate any structures of different temperatures, regardless of which structures are mounted on which portions of the thermal isolator 104. Also note that multiple thermal isolators 104 could be stacked. This provides great flexibility in how the thermal isolator(s) 104 can be used to thermally isolate components.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a first interface platform and a second interface platform, one interface platform configured to be coupled to a support structure and the other interface platform configured to be coupled to a device that operates at a temperature different than a temperature of the support structure;
    at least one intermediate stage platform configured to maintain a separation between the first interface platform and the second interface platform;
    struts affixing the first interface platform to the at least one intermediate stage platform; and
    struts affixing the second interface platform to the at least one intermediate stage platform;
    wherein the apparatus is configured to reduce heat transfer between the support structure and the device; and
    wherein top surfaces of the first and second interface platforms are substantially coplanar.

2. The apparatus of claim 1, wherein the first and second interface platforms are concentric.

3. The apparatus of claim 1, wherein at least a portion of the second interface platform resides within an opening of the first interface platform.

4. The apparatus of claim 1, wherein the struts are arranged in a nested configuration having first and second sets of struts, the second set of struts located within the first set of struts.

5. The apparatus of claim 4, wherein each strut in the first set is substantially parallel to an adjacent strut in the second set.

6. The apparatus of claim 1, wherein:
    the first interface platform comprises a first square ring having a larger size;
    the second interface platform comprises a second square ring having a smaller size; and
    the at least one intermediate stage platform comprises a third square ring with faceted corners and a circular opening.

7. The apparatus of claim 1, wherein the first interface platform, the second interface platform, the at least one intermediate stage platform, and the struts form an integral structure.

8. The apparatus of claim 1, wherein:
    at least three struts affix the first interface platform to the at least one intermediate stage platform; and
    at least three struts affix the second interface platform to the at least one intermediate stage platform.

9. The apparatus of claim 1, wherein:
    the apparatus comprises multiple intermediate stage platforms;
    a first set of struts connects the first interface platform to a first of the intermediate stage platforms;
    a second set of struts connects the second interface platform to a second of the intermediate stage platforms; and
    at least one third set of struts connects the intermediate stage platforms.

10. A system comprising:
    a support structure;
    a device configured to operate at a temperature different than a temperature of the support structure; and
    a thermal isolator configured to reduce heat transfer between the support structure and the device, the thermal isolator comprising:
        a first interface platform and a second interface platform, one interface platform configured to be coupled to the support structure and the other interface platform configured to be coupled to the device;
        at least one intermediate stage platform;
        struts affixing the first interface platform to the at least one intermediate stage platform; and
        struts affixing the second interface platform to the at least one intermediate stage platform;

wherein top surfaces of the first and second interface platforms are substantially coplanar.

11. The system of claim 10, wherein the first and second interface platforms are concentric.

12. The system of claim 10, wherein the struts are arranged in a nested configuration having first and second sets of struts, the second set of struts located within the first set of struts.

13. The system of claim 12, wherein each strut in the first set is substantially parallel to an adjacent strut in the second set.

14. The system of claim 10, wherein:
the thermal isolator comprises multiple intermediate stage platforms;
a first set of struts connects the first interface platform to a first of the intermediate stage platforms;
a second set of struts connects the second interface platform to a second of the intermediate stage platforms; and
at least one third set of struts connects the intermediate stage platforms.

15. A method comprising:
forming first and second interface platforms, one interface platform configured to be coupled to a support structure and the other interface platform configured to be coupled to a device that operates at a temperature different than a temperature of the support structure;
forming at least one intermediate stage platform;
forming multiple struts for affixing the first interface platform to the at least one intermediate stage platform; and
forming multiple struts for affixing the second interface platform to the at least one intermediate stage platform;
wherein top surfaces of the first and second interface platforms are substantially coplanar.

16. The method of claim 15, wherein the first and second interface platforms are concentric.

17. The method of claim 15, wherein forming the first interface platform and forming the second interface platform comprise:
forming a joined pair of interface platforms from a single piece of material; and
forming a gap within the joined pair of interface platforms to separate the first and second interface platforms.

18. The method of claim 15, wherein the first interface platform, the second interface platform, the at least one intermediate stage platform, and the struts are formed using a single piece of material.

19. The method of claim 15, wherein the first interface platform, the second interface platform, the at least one intermediate stage platform, and the struts are formed as an integral structure using casting or injection molding.

20. The method of claim 15, wherein:
the first interface platform, the second interface platform, the at least one intermediate stage platform, and the struts are formed as separate pieces; and
the method further comprises coupling the first and second interface platforms to the at least one intermediate stage platform using the struts.

21. The apparatus of claim 1, wherein:
the top surface of the second interface platform is configured to be coupled to the device; and
the struts affix a bottom surface of the second interface platform.

22. The apparatus of claim 1, wherein:
the first interface platform comprises a warm-stage platform; and
the second interface platform comprises a cold-stage platform.

* * * * *